(12) United States Patent
Chan et al.

(10) Patent No.: US 10,817,477 B2
(45) Date of Patent: *Oct. 27, 2020

(54) PRIORITIZING FILE SYNCHRONIZATION IN A DISTRIBUTED COMPUTING SYSTEM

(71) Applicant: Razer (Asia-Pacific) Pte. Ltd., Singapore (SG)

(72) Inventors: Michael A. Chan, San Francisco, CA (US); Tom Moss, Los Altos, CA (US); Daniel R. Bornstein, San Francisco, CA (US); Justin Quan, San Francisco, CA (US); Linda Tong, San Francisco, CA (US)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 261 days.

This patent is subject to a terminal disclaimer.

(21) Appl. No.: 15/945,795

(22) Filed: Apr. 5, 2018

(65) Prior Publication Data

US 2018/0225303 A1   Aug. 9, 2018

Related U.S. Application Data

(63) Continuation of application No. 14/218,765, filed on Mar. 18, 2014, now Pat. No. 9,965,489.

(Continued)

(51) Int. Cl.
*G06F 16/00* (2019.01)
*G06F 16/178* (2019.01)
(Continued)

(52) U.S. Cl.
CPC .............. *G06F 16/178* (2019.01); *G06F 8/44* (2013.01); *G06F 9/54* (2013.01); *G06F 11/1464* (2013.01);

(Continued)

(58) Field of Classification Search
CPC ............. G06F 16/10–11; G06F 16/119; G06F 16/128; G06F 16/16; G06F 16/168;
(Continued)

(56) References Cited

U.S. PATENT DOCUMENTS 7,039,656 B1   5/2006 Tsai
7,216,289 B2   5/2007 Kagle
(Continued)

FOREIGN PATENT DOCUMENTS

EP   1 939 764 A3   7/2008
EP   1 942 423 A1   7/2008
WO   2006/053019 A2   5/2006

OTHER PUBLICATIONS

Notice of Allowance dated Jan. 27, 2015 for U.S. Appl. No. 14/252,704 by Chan, M.A., et al., filed Apr. 14, 2014.

(Continued)

*Primary Examiner* — Srirama Channavajjala
(74) *Attorney, Agent, or Firm* — Mattingly & Malur PC

(57) ABSTRACT

Some examples include performing a priority synchronization of a computing device to download a selected set of data files to the computing device from a distributed backup system. Data files are downloaded to a computing device by synchronizing with a server of the distributed backup system. A priority sync downloads a subset of the data files as priority files, rather than all of the data files of the user, thereby minimizing the computing resources consumed to download the data files. The priority sync can select the priority files based on various criteria, including an access pattern of the data files, attributes of the data files, or attributes of the computing device. The priority sync may also download non-priority files. The priority files may be downloaded in their original format and the non-priority files may be downloaded in a downgraded format.

16 Claims, 9 Drawing Sheets

Related U.S. Application Data

(60) Provisional application No. 61/804,134, filed on Mar. 21, 2013.

(51) Int. Cl.

| | | |
|---|---|---|
| *G06F 9/54* | (2006.01) | |
| *G06F 16/16* | (2019.01) | |
| *G06F 16/27* | (2019.01) | |
| *G06F 16/11* | (2019.01) | |
| *G06F 16/182* | (2019.01) | |
| *G06F 16/17* | (2019.01) | |
| *G06F 16/2457* | (2019.01) | |
| *H04L 29/08* | (2006.01) | |
| *H04W 12/06* | (2009.01) | |
| *G06F 11/14* | (2006.01) | |
| *H04L 12/24* | (2006.01) | |
| *H04L 12/911* | (2013.01) | |
| *H04L 29/06* | (2006.01) | |
| *G06F 8/41* | (2018.01) | |

(52) U.S. Cl.
CPC .......... *G06F 16/113* (2019.01); *G06F 16/116* (2019.01); *G06F 16/122* (2019.01); *G06F 16/16* (2019.01); *G06F 16/168* (2019.01); *G06F 16/1734* (2019.01); *G06F 16/1787* (2019.01); *G06F 16/182* (2019.01); *G06F 16/24578* (2019.01); *G06F 16/27* (2019.01); *H04L 41/0816* (2013.01); *H04L 47/70* (2013.01); *H04L 47/78* (2013.01); *H04L 63/0853* (2013.01); *H04L 67/06* (2013.01); *H04L 67/10* (2013.01); *H04L 67/1095* (2013.01); *H04L 67/1097* (2013.01); *H04L 67/22* (2013.01); *H04L 67/306* (2013.01); *H04L 69/04* (2013.01); *H04W 12/06* (2013.01); *G06F 11/1451* (2013.01); *G06F 11/1469* (2013.01)

(58) Field of Classification Search
CPC .... G06F 16/17; G06F 16/178; G06F 16/1787; G06F 16/27; G06F 16/275; G06F 16/13; G06F 16/113; G06F 16/116; G06F 16/122; G06F 16/182; G06F 16/24578; G06F 16/40; G06F 11/1435; G06F 11/1469
See application file for complete search history.

(56) References Cited

U.S. PATENT DOCUMENTS

| | | | |
|---|---|---|---|
| 7,330,997 B1 * | 2/2008 | Odom | G06F 11/1464 |
| | | | 711/162 |
| 7,885,925 B1 | 2/2011 | Strong | |
| 8,095,577 B1 * | 1/2012 | Faibish | G06F 16/13 |
| | | | 707/823 |
| 8,612,470 B1 * | 12/2013 | Fushman | G06F 16/9535 |
| | | | 707/767 |
| 8,949,179 B2 | 2/2015 | Besen | |
| 9,106,627 B2 * | 8/2015 | Campbell | H04L 67/28 |
| 9,965,489 B2 * | 5/2018 | Chan | G06F 16/27 |
| 2001/0034728 A1 * | 10/2001 | McBride | G06F 11/1464 |
| 2002/0078075 A1 | 6/2002 | Colson | |
| 2002/0087588 A1 * | 7/2002 | McBride | G06F 11/1464 |
| 2002/0194260 A1 | 12/2002 | Headley | |
| 2003/0233379 A1 | 12/2003 | Cohen | |
| 2005/0042591 A1 | 2/2005 | Bloom | |
| 2005/0165796 A1 | 7/2005 | Moore | |
| 2005/0172296 A1 * | 8/2005 | Schleifer | G06F 16/275 |
| | | | 719/310 |
| 2005/0262371 A1 | 11/2005 | Luke | |
| 2006/0218224 A1 | 9/2006 | Agrawal | |
| 2006/0224620 A1 * | 10/2006 | Silverman | G11B 27/10 |
| 2007/0083482 A1 | 4/2007 | Rathi | |
| 2007/0180084 A1 * | 8/2007 | Mohanty | G06F 11/1464 |
| | | | 709/223 |
| 2007/0204003 A1 | 8/2007 | Abramson | |
| 2007/0204115 A1 | 8/2007 | Abramson | |
| 2007/0220062 A1 | 9/2007 | Carberry | |
| 2008/0005120 A1 * | 1/2008 | Li | H04L 67/104 |
| 2008/0024520 A1 | 1/2008 | Rudd | |
| 2008/0147747 A1 * | 6/2008 | Cardamore | G06F 16/40 |
| 2008/0168526 A1 | 7/2008 | Robbin | |
| 2009/0177654 A1 | 7/2009 | Beaupre et al. | |
| 2009/0282169 A1 * | 11/2009 | Kumar | H04L 67/1095 |
| | | | 709/248 |
| 2011/0270839 A1 * | 11/2011 | Jensen | G06F 3/0643 |
| | | | 707/737 |
| 2012/0151136 A1 | 6/2012 | Hay | |
| 2013/0212067 A1 | 8/2013 | Piasecki | |
| 2013/0311990 A1 * | 11/2013 | Tang | G06F 9/45558 |
| | | | 718/1 |
| 2014/0092757 A1 * | 4/2014 | Xu | G06F 11/349 |
| | | | 370/252 |
| 2014/0289196 A1 | 9/2014 | Chan | |

OTHER PUBLICATIONS

Non-Final Office Action dated Jul. 11, 2014 for U.S. Appl. No. 14/252,704 by Chan, M.A. et al., filed Apr. 14, 2014.
Non-Final Office Action dated Aug. 6, 2014 for U.S. Appl. No. 14/273,451 by Chan, M.A. et al., filed May 8, 2014.

\* cited by examiner

PRIORITIZING FILE SYNCHRONIZATION IN A DISTRIBUTED COMPUTING SYSTEM

CROSS-REFERENCES TO RELATED APPLICATIONS

This application is a continuation of, and claims priority to, U.S. patent application Ser. No. 14/218,765, filed Mar. 18, 2014, which claims the benefit of U.S. Provisional Patent Application No. 61/804,134, filed on Mar. 21, 2013, which applications are incorporated by reference herein in their entireties.

TECHNICAL FIELD

Several of the disclosed embodiments relate to file synchronization in a distributed computing system, and more particularly, to prioritizing files for synchronization to a user device.

BACKGROUND

Portable devices such as mobile phones, smartphones, and tablet computers have become more common among individuals. A large amount of data may be stored on these devices which may be needed to be backed up. Cloud computing technology may permit a user to back up their data on a remote server. The user may access the files using many devices. The user can download the files to a particular computing device by synchronizing the computing device with remote server. A synchronization application running on the computing device and the remote server can facilitate transmission of data files between the remote server and the computing device. However, the current synchronization applications are inefficient, at least in terms of consumption of computing resources for downloading the files. Typically, when a computing device is synchronized with the remote server, the synchronization application downloads all of the data files that have been added to or changed in the remote server since the computing device was last synchronized.

Downloading all of the data files that have changed or have been added since the last sync can consume significant time, e.g., if the number of data files in the remote server is large. For example, when the user synchronizes a new computing device with the remote server, the synchronization application can consume more time since all the data files have to be downloaded to the new computing device. Further, if the network connecting the user and the remote server is congested, if the available network bandwidth is low, or if the remote server is busy serving other requests, downloading all the files from the remote server can consume significant time. If the connection between the remote server and the user device breaks, the user may have to download the files again; this can be time consuming. Often, users may not backup their devices' data due to the extra effort and time involved.

DETAILED DESCRIPTION

Figure 1:
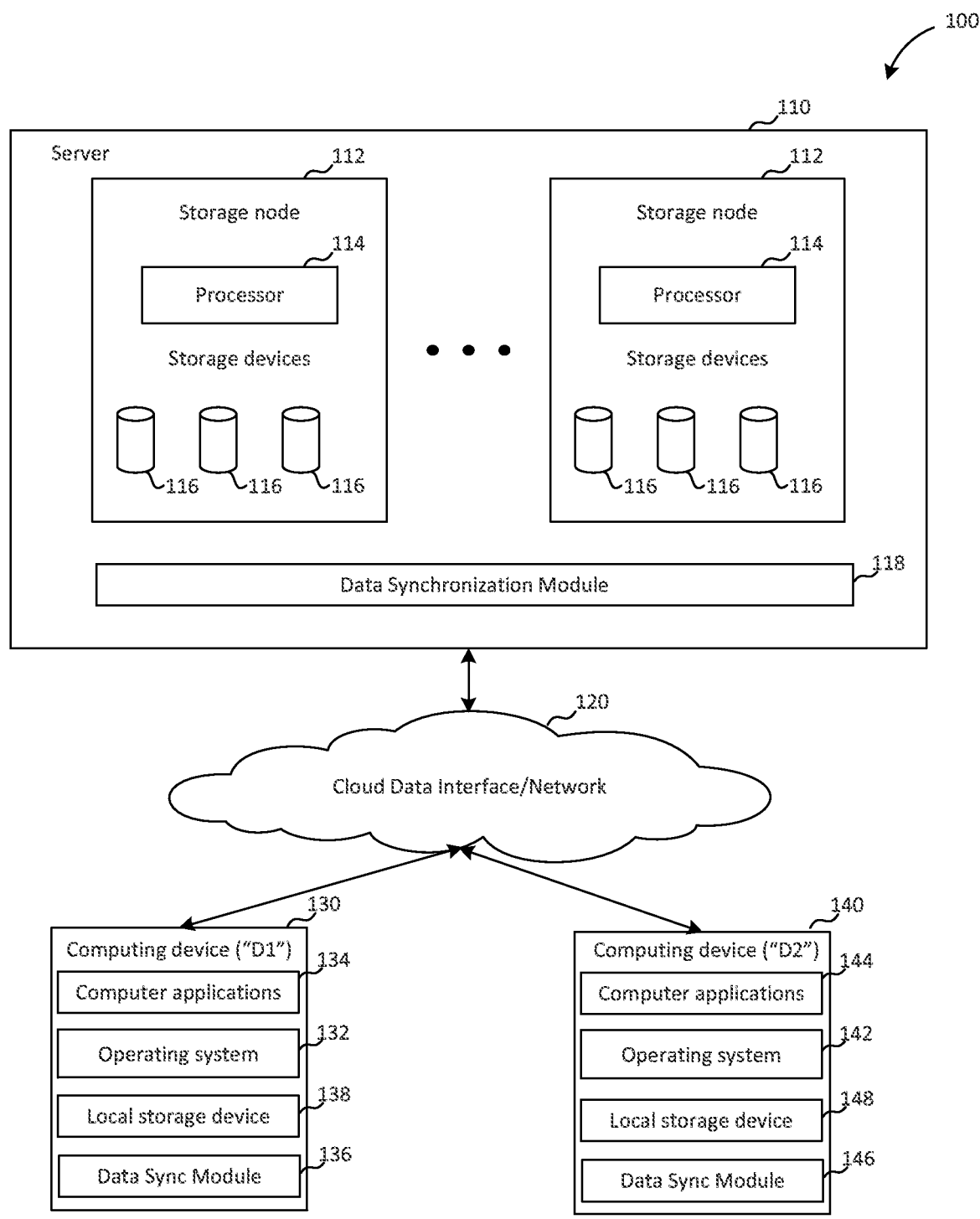
FIG. 1 is a block diagram illustrating an environment in which a priority synchronization can be implemented.

Technology is disclosed for performing a priority synchronization ("sync") of a computing device in a distributed backup system to download a selected set of data files to the computing device ("the technology"). In some embodiments, the distributed backup system can store multiple data files of a user in a server, e.g., a cloud storage server. Additionally or alternatively, the distributed backup system can store the data files across multiple computing devices of the user, e.g., mobile computing devices such as a tablet, a laptop, or a smartphone that collectively form the distributed backup system. The user may access the data files using one or more of the computing devices.

When a user synchronizes a particular computing device, e.g., a new computing device that has not been synchronized with the distributed backup system yet, the technology can perform a priority sync on the particular computing device. In some embodiments, the priority sync downloads a subset of the data files (also referred to as "priority files") to the computing device rather than all of the data files of the user, thereby minimizing the computing resources, e.g., time, storage space, network bandwidth, consumed to download the file. In some embodiments, the priority sync selects the subset of data files to be downloaded based on an access pattern of the data files by the user on the other computing devices of the user. For example, if the data files are image files, the priority sync can select the images that have been viewed a particular number of times, images that have been viewed most recently, e.g., on another computing device, images that the user has indicated as important, or images that is likely to be accessed by the user on the particular computing device.

In some embodiments, the priority sync can also download the remaining data files of the user (also referred to as "non-priority files"), that is, the data files other than the priority files, to the particular computing device. In some embodiments, while the priority sync downloads the priority files in their corresponding original format, the priority sync downloads the non-priority files in another format, e.g., downgraded format of the original format of the corresponding non-priority files. In some embodiments, a downgraded format is a format of the file that contains lower amount of information than that of the original format so that sync consumes lesser time and/or bandwidth compared to the original format. For example, a non-priority image file can be downloaded as thumbnail of the image file, a low resolution image of the image file, or a reduced file size version of the image file. In another example, a non-priority music file can be downloaded as low bit-rate version of the music file, a shorter duration version of the music file, or a reduced file size version of the music file. In some embodiments, by downloading the non-priority files in a downgraded format, not only is the computing resources, e.g., time, storage space, network bandwidth, consumed to download the non-priority data files is minimized, the particular computing device has information regarding all the data files, e.g., priority files and non-priority files, of the user.

In some embodiments, a data synchronization module on the particular computing device and/or the server can have priority sync policies based on which the priority sync is performed. For example, the priority sync policies can define the access pattern based on which the set of data files are selected. In another example, the policies can define policies for selecting the set of data files based on the type of the particular computing device or the type of a particular data file to be downloaded. In yet another example, the priority sync policies can define whether to download the non-priority files to the particular computing device, if yes, then the downgraded format in which the non-priority files are to be downloaded. A user, e.g., user of the computing device or the administrator of the distributed backup system, can further customize the priority policies or add new priority sync policies.

Environment

FIG. 1 is a block diagram illustrating an environment in which a priority sync can be implemented in a distributed backup system. The distributed backup system 100 includes a server 110, e.g., a cloud storage server, configured to handle communications between a first computing device 130 and a second computing device 140. The server 110 contains storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

A cloud data interface 120 can also be included to receive data from and send data to the computing devices 130 and 140. The cloud data interface 120 can include network communication hardware and network connection logic to receive the information from computing devices. The network can be a local area network (LAN), wide area network (WAN) or the Internet. The cloud data interface 120 may include a queuing mechanism to organize data update received from or sent to the computing devices 130 and 140.

In some embodiments, any communication between the computing devices 130 and 140 is routed through the server 110. For example, data related to computer applications 134 and 144 or data files to be backed up in the distributed backup system 100, can be exchanged between the computing devices 130 and 140 through server 110. In some embodiments, where the computing devices 130 and 140 can communicate with each other directly using a P2P communication technique, e.g. Bluetooth, the server 110 facilitates the computing devices 130 and 140 to communicate with each other directly for exchanging the data. In some embodiments, the computing devices 130 and 140 can communicate directly with each other without any coordination by the server 110. In some embodiments, while the computing devices 130 and 140 send/receive the data directly, the server 110 may also obtain a copy of the data.

Although FIG. 1 illustrates two computing devices, computing devices 130 and 140, a person having ordinary skill in the art will readily understand that the technology disclosed herein can be applied to a single computing device or more than two computing devices connected to the server 110.

The computing devices 130 and 140 include an operating system 132 and 142 to manage the hardware resources of the computing devices 130 and 140 and provide services for running computer applications 134 and 144 (e.g., mobile applications running on mobile devices). The operating system 132 and 142 facilitates execution of the computer applications 134 and 144 on the computing device 130 and 140. The computing devices 130 and 140 include at least one local storage device 138 and 148 to store the computer applications 134 and 144 and user data. The computing device 130 and 140 can be a desktop computer, a laptop computer, a tablet computer, an automobile computer, a game console, a smartphone, a personal digital assistant, home appliances, televisions, automobiles, drones, airplanes, autonomous devices such as robots, or other computing devices capable of running computer applications, as contemplated by a person having ordinary skill in the art. Some examples of the operating system 132 and 142 include Android, iOS, Windows, etc.

The computer applications 134 and 144 stored in the computing devices 130 and 140 can include applications for general productivity and information retrieval, including email, calendar, contacts, stock market and weather information. The computer applications 134 and 144 can also include applications in other categories, such as mobile games, factory automation, GPS and location-based services, banking, order-tracking, ticket purchases or any other categories as contemplated by a person having ordinary skill in the art.

All or some of the network connections of the computing devices 130 and 140 are through the server 110. The network connections can include Transmission Control Protocol (TCP) connections, User Datagram Protocol (UDP) connections, or other types of network connections based on other protocols. When there are multiple computer applications 134 and 144 that need network connections to multiple remote servers, the computing devices 130 and 140 only needs to maintain one network connections with the server 110. The server 110 will in turn maintain multiple connections with the remote servers on behalf of the computer applications 134 and 144.

A user, e.g., a user associated with the computing devices 130 and 140, can back up his/her data files to the server 110, which can store the data files in the storage device 116. In some embodiments, the server 110 can also store the data files across multiple computing devices of the user, e.g., computing devices 130 and 140 and/or server 110. The data files can be backed up across the computing devices 130 and 140 and the server 110 based on various data backup policies. The user can access, e.g., read or modify, the data files stored at the server 110 using one or more of the computing devices 130 and 140. A user can download the latest version of the data files from the server 110 to a particular computing device by synchronizing the particular computing device with the server 110. The user can perform a normal sync or a priority sync to download the data files to the particular computing device. The data sync modules 136 and 146 on the computing devices 130 and 140, respectively, coordinate with the data sync module 118 on the server 110 to backup the data files to the server 110, and to download the data files from the server 110 to the computing devices 130 and 140 using normal sync or priority sync. Additional details with respect to the priority sync are described at least with reference to FIGS. 2-8.

Figure 2:
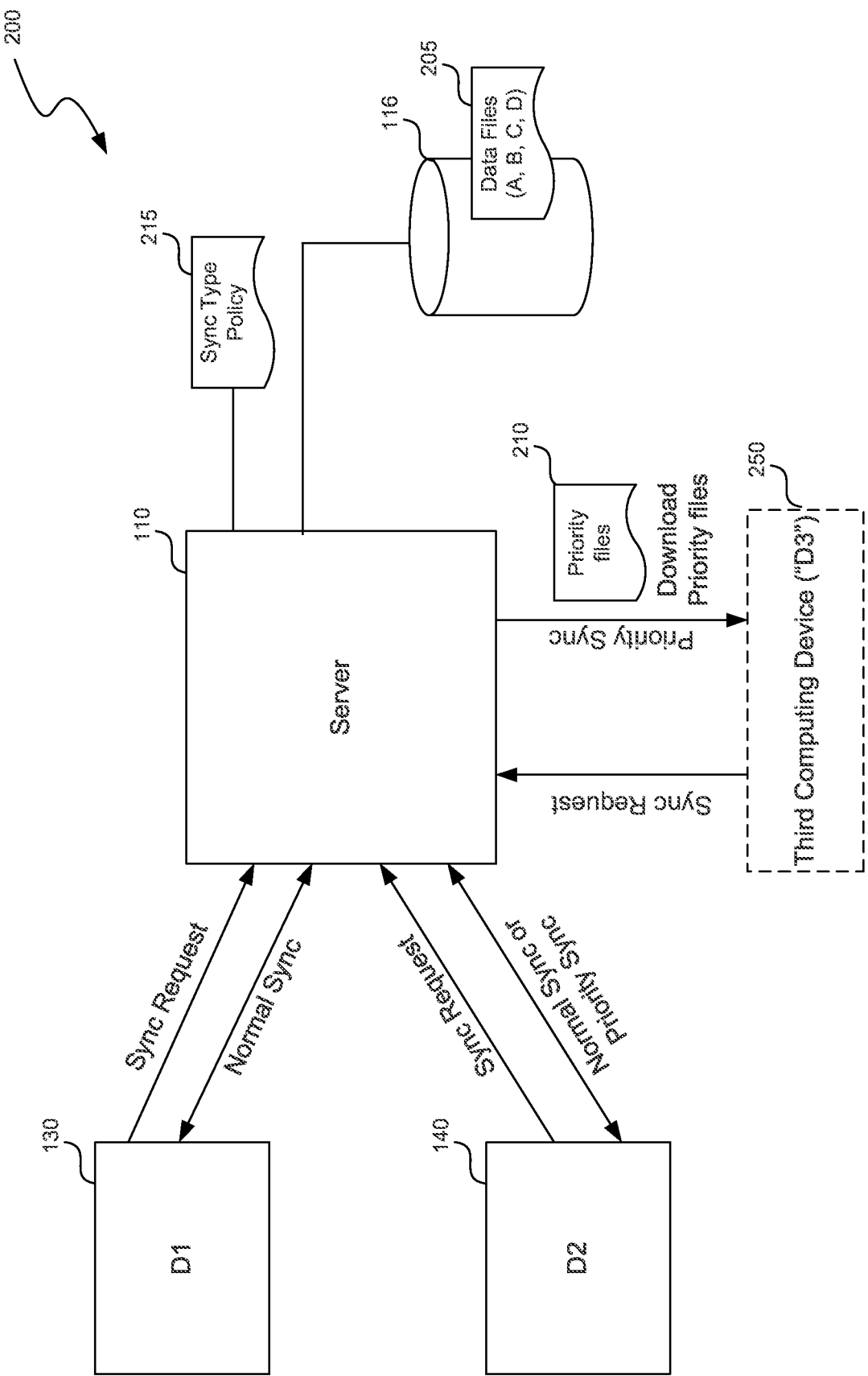
FIG. 2 is an example illustrating various types of sync, including a priority sync, in a distributed backup system.

FIG. 2 illustrates an example 200 of performing various types of sync, including a priority sync, in a distributed backup system such as the distributed backup system 100 of FIG. 1. In some embodiments, a normal sync of a particular computing device downloads all of the data files that have been added or changed in the distributed backup system 100 since the particular computing device was last synchronized. For example, if the particular computing device is a new computing device that has not been previously synchronized with the server 110, the normal sync can download all the data files of the user from the server 110. In another example, if the particular computing device has not been synchronized for a significant period, the number of data files that may have changed or have been added at the server 110 may be significant. This can consume significant computing resources, especially, if the number of data files is large.

A priority sync can download a selected subset of the data files, that is, priority files, rather than all of the data files to minimize the consumption of computing resources. The priority files can be selected based on various factors, which are described in the following paragraphs. In some embodiments, the priority sync can also download the non-priority files but in a downgraded format, thereby providing a complete view of all the data files of the user and still minimizing the consumption of computing resources.

Synchronization requests from the computing devices can be categorized into normal sync or priority sync based on a synchronization type policy 215. For example, the sync type policy 215 may consider a sync request from any previously synchronized computing devices, e.g., computing devices 130 and 140, as a normal sync request. In another example, the sync type policy 215 may consider a sync request from a previously synchronized computing device, e.g., computing device 140, as a priority sync request if the user requests for a priority sync in the sync request. In yet another example, the sync type policy 215 may consider a sync request from a new computing device of the user, e.g., a third computing device 250, that has not been previously synced with the server 110 as a priority sync. In still another example, the sync type policy 215 may consider a sync request from the third computing device 250 as a normal sync if the user requests so. A user such as an administrator of the distributed backup system 100, can define the sync type policy 215. In some embodiments, a user such as a user associated with the computing devices 130, 140 and 250 can further customize the sync type policy 215 defined by the administrator or can define additional sync type policies.

In the example 200, the computing devices 130, 140 and 250 are associated with a particular user. The user has backed up data files 205 to the distributed backup system 100, which are stored at the storage device 116 of the server 110. In some embodiments, a data file is a container for data, and stores data in a structured manner. In some embodiments, a data file is organized into one-dimensional arrays of bytes. The format of a data file is defined by its content. At any instant in time, a data file might have a size, normally expressed as number of bytes, that indicates how much storage is associated with the data file. A data file can be a text file containing text, an email file containing an email or a portion thereof, an image file containing an image or a portion thereof, etc. A data file may contain an arbitrary binary image (a BLOB). The data files 205 include at least four files "A," "B," "C" and "D." The type of the data files 205 can include at least one of an image, an audio, a video, a document, an email, an application, audio-video file, etc. The format of the data files 205 can include at least one of Joint Photographic Experts Group (JPEG), a bitmap, a Microsoft Word document, a Portable Document Format (PDF), MP3, Advanced Audio Coding (AAC), executable format (.exe), etc.

Further, in the example 200, the computing devices 130 and 140 have been previously synced with the server 110, whereas the third computing device 250 is a new computing device, e.g., a computing device that has not been synchronized with the server 110 previously. Further, the sync type policy 215 categorizes the requests from previously synced computing devices 130 and 140 as normal sync and from the new computing device 250 as priority sync. When the user requests to sync the third computing device 250, the server 110 determines that the computing device 250 is a new computing device and therefore, performs a priority sync.

As part of the priority sync, the server 110 identifies the priority files 210 to be transmitted to the computing device 250 and transmits the priority files 210 to the computing device 250. The priority files 210 is a subset of the data files 205 identified based on various factors such as access pattern of the data files 205 by the user. Additional details with respect to identifying the priority files 210 is described at least with reference to FIG. 3 in the following paragraphs.

Figure 3:
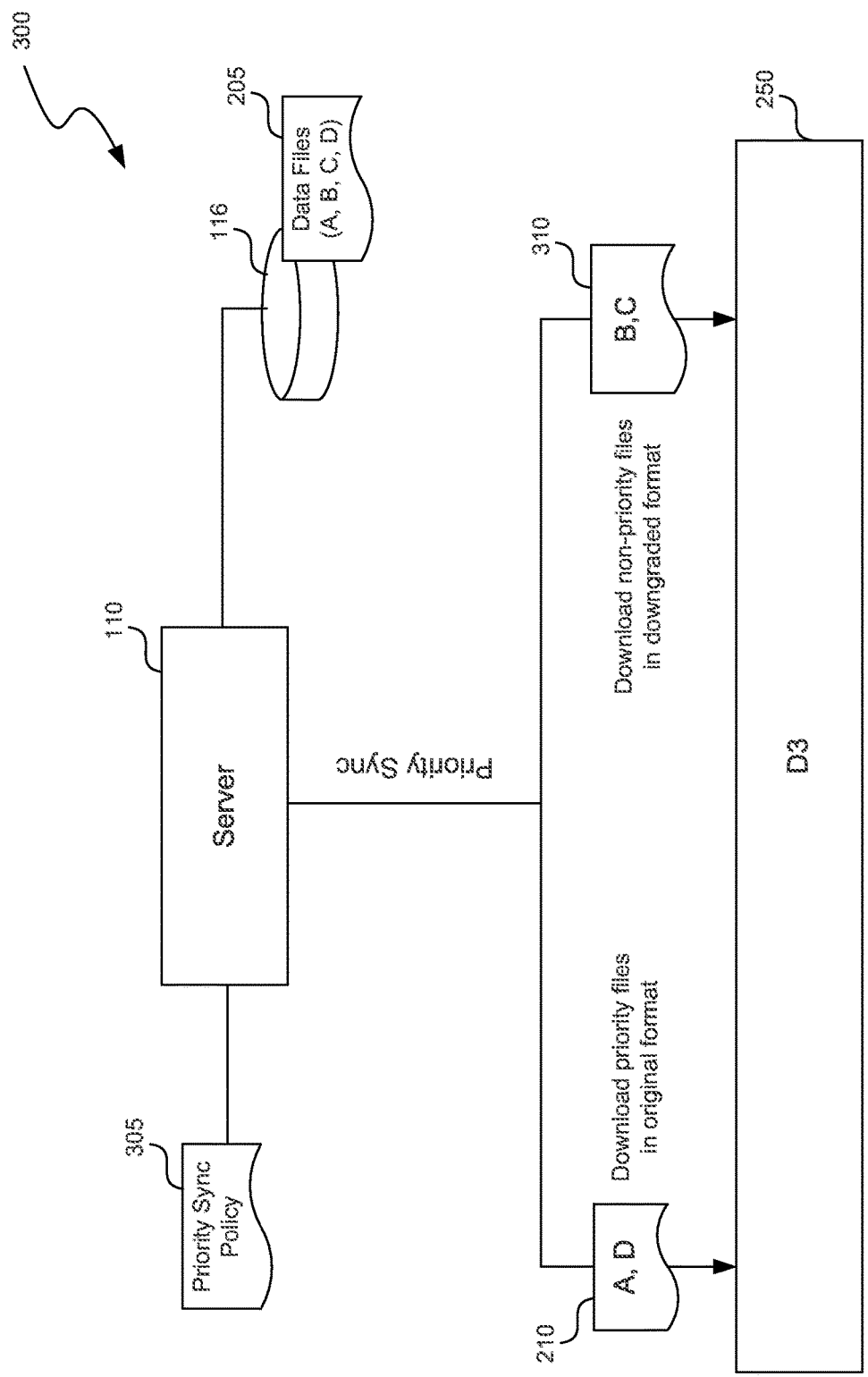
FIG. 3 is an example illustrating downloading priority files and non-priority files in a priority sync of a computing device.

FIG. 3 is an example 300 illustrating downloading priority files and non-priority files in a priority sync of a computing device in a distributed backup system. The distributed backup system 100 includes a priority-sync policy 305 that includes various criteria for identifying the priority files 210 of the data files 205. The server 110 identifies the priority files 210 based on the priority-sync policy 305 and then transmits the priority files 210 to the computing device 250. In some embodiments, the administrator of the distributed backup system 100 and/or the user of the computing device 250 can define the criteria for identifying the priority files 210. Further, the user can also select a particular priority-sync policy 305 based on which the priority sync identifies the priority files 210.

In some embodiments, the criterion for identifying the priority files 210 can include an access pattern of the data files 205. The access pattern can include data regarding (a) a frequency of access of a particular data file (b) a number of times the particular data file is requested or downloaded to any of the computing devices, from the particular computing device, (c) a frequency of access of the particular data file using a particular computing device similar to the computing device 250, (d) a period for which the particular data file is accessed using the particular computing device, (e) most recently accessed set of data files, (f) a period for which the particular data file is accessed, etc.

In some embodiments, the administrator of the distributed backup system 100 and/or the user of the computing device 250 can define the criteria for determining whether two computing devices are similar. In some embodiments, the criterion can consider device attributes, such as processing capacity, a total available space, size of a display, resolution of the display, battery capacity, or an operating system and/or applications executing on the computing device, of the two computing devices to determine whether they are similar. For example, if the processing capacity, such as processor clock speed, of the two devices are within a particular range, the computing devices may be considered similar. In another example, if the size and/or resolution of the display of the two devices are within a particular range, the computing devices may be considered similar.

Referring back to the priority-sync policy 305, the criterion for identifying the priority files 210 can also include attributes of a particular data file, e.g., a type, size, created date, modified date, a format, or a category. In some embodiments, the category can be a category to which the data file belongs, e.g., user defined categories such as entertainment, business, or personal. For example, the user may define the priority-sync policy 305 to identify audio files from the data files 205 as priority files. In another example, the user may define the priority-sync policy 305 to identify the most recently accessed photos or images from the data files 205 as priority files. In another example, the user may define the priority-sync policy 305 to identify all personal emails from the data files 205 as priority files.

The criterion for identifying the priority files 210 can also include attributes of the computing device 250, e.g., processing capacity, a total available space, size of a display, resolution of the display, battery capacity, or an operating system and/or applications executing on the computing device. For example, the user may define the priority-sync policy 305 to identify audio files from the data files 205 as priority files if the computing device 250 is a smartphone. In another example, the user may define the priority-sync policy 305 to identify video files from the data files 205 as priority files if the computing device 250 is a laptop or a tablet PC. In still another example, the user may define the priority-sync policy 305 to identify audio files of AAC format from the data files 205 as priority files if the computing device 250 has an iOS operating system.

The criterion for identifying the priority files 210 can also include one or more of (a) a likelihood of a particular data file being accessed by the user or (b) a likelihood of the particular data file being accessed using the third computing device 250. For example, the user may define the priority-sync policy 305 to identify an executable file corresponding to an application that the user is likely to access, e.g., in the next hour, day, week etc., as a priority file. In another example, the user may define the priority-sync policy 305 to identify data files, e.g., video files, from the data files 205 that the user is likely to access if the computing device 250 is a tablet PC as a priority files.

While the priority-sync policy 305 contain criteria for identifying priority files 210, the user may also define the criteria for identifying certain data files 205 as non-priority files 310. For example, the user may define a priority-sync policy 305 to identify personal data files from the data files 205 as a non-priority files if the computing device 250 is identified by the user as an official computing device. In another example, the user may define a priority-sync policy 305 to identify video files from the data files 205 as non-priority files if the computing device 250 is a smartphone which has a relatively small screen and if the user is less likely to watch the video files on the computing device 250. In another example, the user may define a priority-sync policy 305 to identify a data file of a particular size from the data files 205 as a non-priority file if the storage space in the computing device 250 is below a particular threshold. Accordingly, various such criteria can be defined for identifying non-priority files. In some embodiments, if the priority-sync policy 305 does not contain any policy for identifying non-priority files, all the data files that are not identified as priority files 210 are identified as non-priority files 310.

After the server 110 identifies the priority files 210, the priority files 210 are transmitted to the computing device 250. The priority files 210 are transmitted to the computing device 250 in a particular format, e.g., an original format of the corresponding priority files 210. For example, a high resolution JPG image file from the data files 205 identified as a priority file is transmitted in the same format. In the example 300, the server 110 identifies two of the data files 205, data files "A" and "D," as a priority files 210 and transmits the priority files 210 to the computing device 250 in its original format. Accordingly, by downloading a subset of the data files 205 to the computing device 250 rather than all of the data files 205 of the user, the priority sync minimizes the computing resources, e.g., time, storage space, network bandwidth, consumed to download the data files 205 of the user. While the computing device 250 contains the priority files 210, it does not contain the data files that are not identified as priority files 210, that is, the non-priority files 310 of the user.

In some embodiments, the non-priority files 310 can be downloaded to the computing device 250 in a subsequent synchronization (e.g., subsequent to the first time the computing device 250 is synced with the server 110 or subsequent to the priority sync of the computing device 250) of the computing device 250. Alternatively, the non-priority files 310 can be downloaded to the computing device 250 as part of the priority sync but in a downgraded format, e.g., downgraded compared to the original format of the data files. In some embodiments, the downgraded format of a particular data file can include one or more of (a) metadata of the particular data file, (b) a shortcut link to the particular data file, or (c) a reduced file size version of the original format of the particular data file stored at the server 110. For example, if a data file is an image file, the downgraded format of the image file can a reduced file size image file (e.g., a potable network graphics (PNG) format), a reduced image size such as a thumbnail, or a lower resolution version of the original format of the image file stored at the server 110. In another example, if the data file is an audio/video file, the downgraded format of the audio/video file can be a reduced file size audio/video file, a shorter duration audio/video file such as an audio or video file containing a particular duration, e.g. 30 seconds of the original audio/video file, or a lower bit-rate version of the original audio/video file stored at the server 110.

Typically, the computing resources required for downloading the data files in a downgraded format are significantly less compared to that of the original format. While downloading the non-priority files 310 along with the priority files 210 provides a complete view of all the data files of the user to the user, the server 110 still minimizes the consumption of computing resources by downloading the non-priority files 310 in a downgraded format.

A non-priority file downloaded in the downgraded format may be used, e.g., at a later time when the user wishes to, to download the non-priority file in the original format. For example, when the user selects a thumbnail of an image file at the computing device 250, the computing device 250 can request the server to transmit the image file to the computing device 250 in the original format stored at the server 110. In another example, upon viewing the shorter duration video clip of a video file at the computing device 250, the user may request the server 110 to transmit the video file to the computing device 250 in the original format stored at the server 110. The data sync module (not illustrated) on the computing device 250 can be configured to download an original format of the downgraded non-priority data file to the computing device 250 automatically upon user access of the downgraded format of the non-priority file or upon a user request to download the original format.

In some embodiments, the server 110 can generate and store downgraded format for at least some of the data files 205. Various known techniques can be used to generate a downgraded format of a particular data file. In some embodiments, the server 110 can identify the source of a data file, and obtain a downgraded format of the data file from the source. For example, if an MP3 music file uploaded to the server 110 is a file that the user of the computing device 250 downloaded from a particular source, the server 110 can obtain a downgraded format of the MP3 file, e.g., a lower bit rate or a shorter duration file, from the particular source and store at the storage device 116. In some embodiments, the user of the computing devices 130, 140 and 250 can provide a copy of the downgraded format for the data files 205 to the server 110, e.g., initially when the data files 205 are backed up to the server 110.

Figure 4:
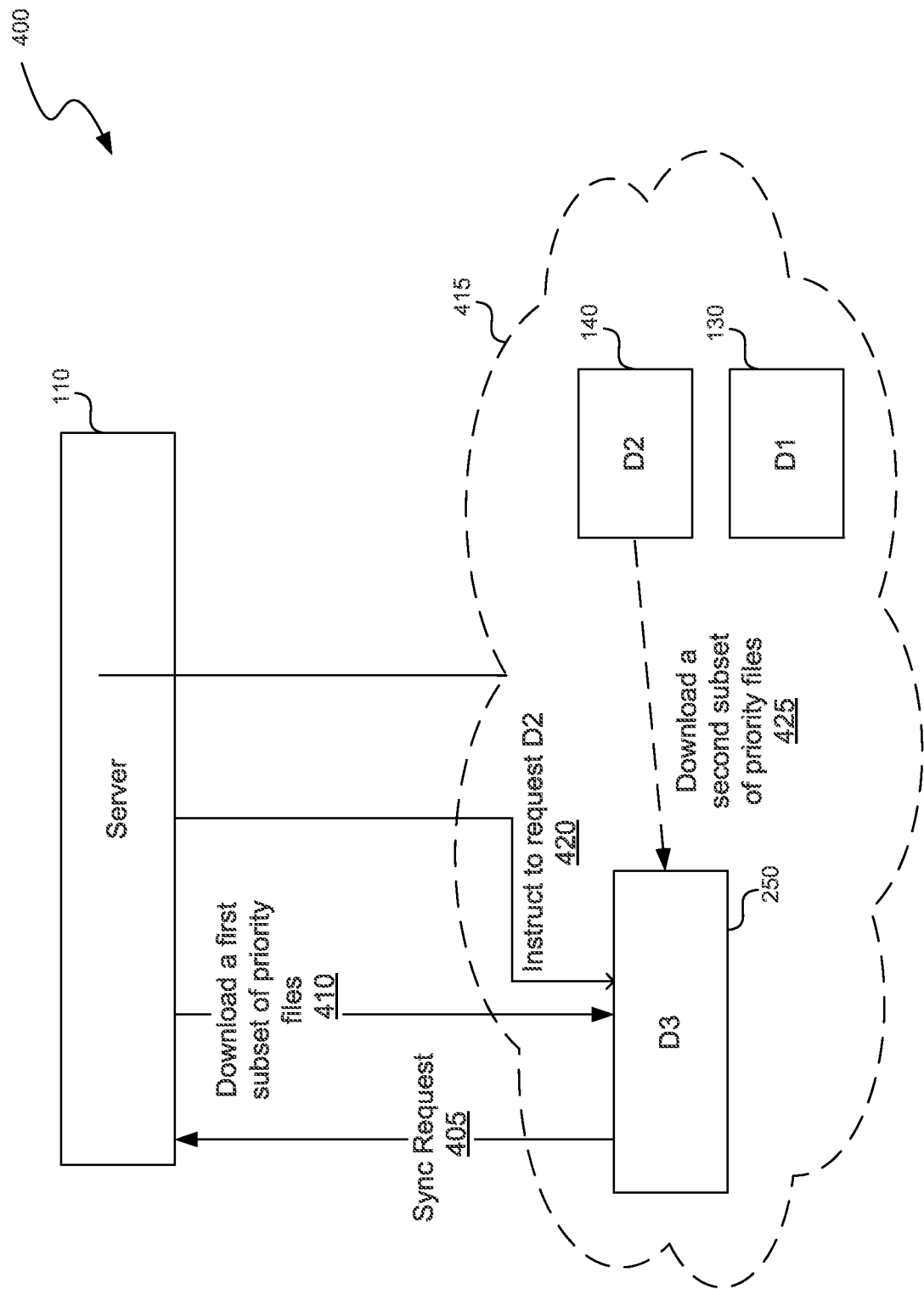
FIG. 4 is an example illustrating downloading data files to a computing device from another computing device in a distributed backup system.

FIG. 4 is an example 400 illustrating downloading data files to a computing device from another computing device in a distributed backup system. In some embodiments, the example 400 can be implemented in the distributed backup system 100 of FIG. 1. In some embodiments, the computing device 250 can obtain the data files, e.g., priority files 210 from another computing device, e.g., a computing device that is in proximity 415 to the computing device 250. When the server 110 transmits the priority files 210 to the computing device 250, either as part of priority sync or normal sync, if the server 110 determines that a computing device which is in proximity 415 to the computing device 250 contains one or more of the priority files 210, the server 110 instructs the computing device 250 to obtain the one or more of the priority files 210 from the proximate computing device. The server 110 transmits the rest of the priority files 210, if any, to the computing device 250.

For example, a user issues a sync request 405, e.g., priority sync request, to the server 110, to download priority files 210 (containing data files "A" and "D") to the computing device 250. The server 110 determines that at least one of the computing devices which is in proximity 415 to the computing device 250, e.g., the computing device 140, contains data file "A" but none of the proximate computing devices contain data file "D." The server 110 transmits the first subset 410 of the priority files 210, e.g., data file "D" to the computing device 250, and instructs 420 the computing device 250 to download the second subset 425 of the priority files 210, e.g., data file "A" from the proximate computing device 140. The computing device 250 communicates with computing device 140 to download the second subset 425. In some embodiments, the computing devices 250 and 140 communicate with each other using various direct communication techniques. A direct communication technique can include Wi-Fi communication via a wireless access point and peer-to-peer (P2P) communication techniques, e.g., Bluetooth, Wi-Fi, Wi-Fi direct, AirDrop, Infrared, or near field communication (NFC).

In some embodiments, the server 110 determines that the computing devices 140 and 250 are in proximity 415 to one another if the computing device 140 and the computing device 250 satisfy a proximity based criterion.

In some embodiments, the proximity based criterion can include determining whether the computing devices 140 and 250 can communicate directly, for example, using direct communication techniques. If the computing devices 140 and 250 can communicate directly, they are considered to satisfy the proximity based criterion.

In some embodiments, the proximity based criterion can include determining whether the computing devices 140 and 250 share a common communication network, e.g. a wireless network such as a home Wi-Fi network. If the computing devices 140 and 250 share a common communication network, they are considered to satisfy the proximity based criterion.

Figure 5:
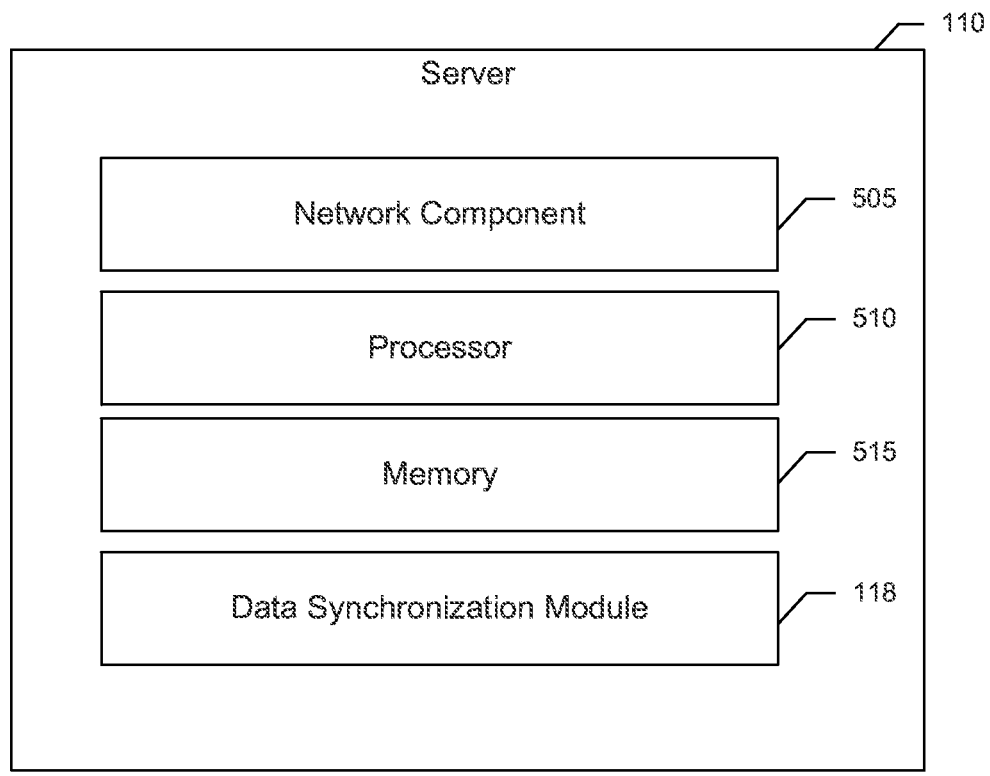
FIG. 5 is a block diagram of the server in the distributed backup system.

FIG. 5 is a block diagram of the server 110 in a distributed backup system. The server 110 can be, e.g., a dedicated standalone server, or implemented in a cloud computing service having a plurality of servers. The server 110 includes a network component 505, a processor 510, a memory 515, and a data sync module 118. The memory 515 can include instructions which when executed by the processor 510 enables the server 110 to perform the functions, including data backup and retrieval, as described with reference to FIGS. 1-4. The network component 505 is configured for network communications with other devices, including the computing devices 130, 140 and 250, e.g., for receiving data files for backup, sending data files upon synchronization requests. The data sync module 118 facilitates the server 110 to perform the functions, including receiving and/or sending data files from/to computing devices 130, 140 and 250 as part of data synchronization, as described with reference to FIGS. 1-4. Additional details with respect to the data sync module 118 are described with reference to FIG. 7 below.

Figure 6:
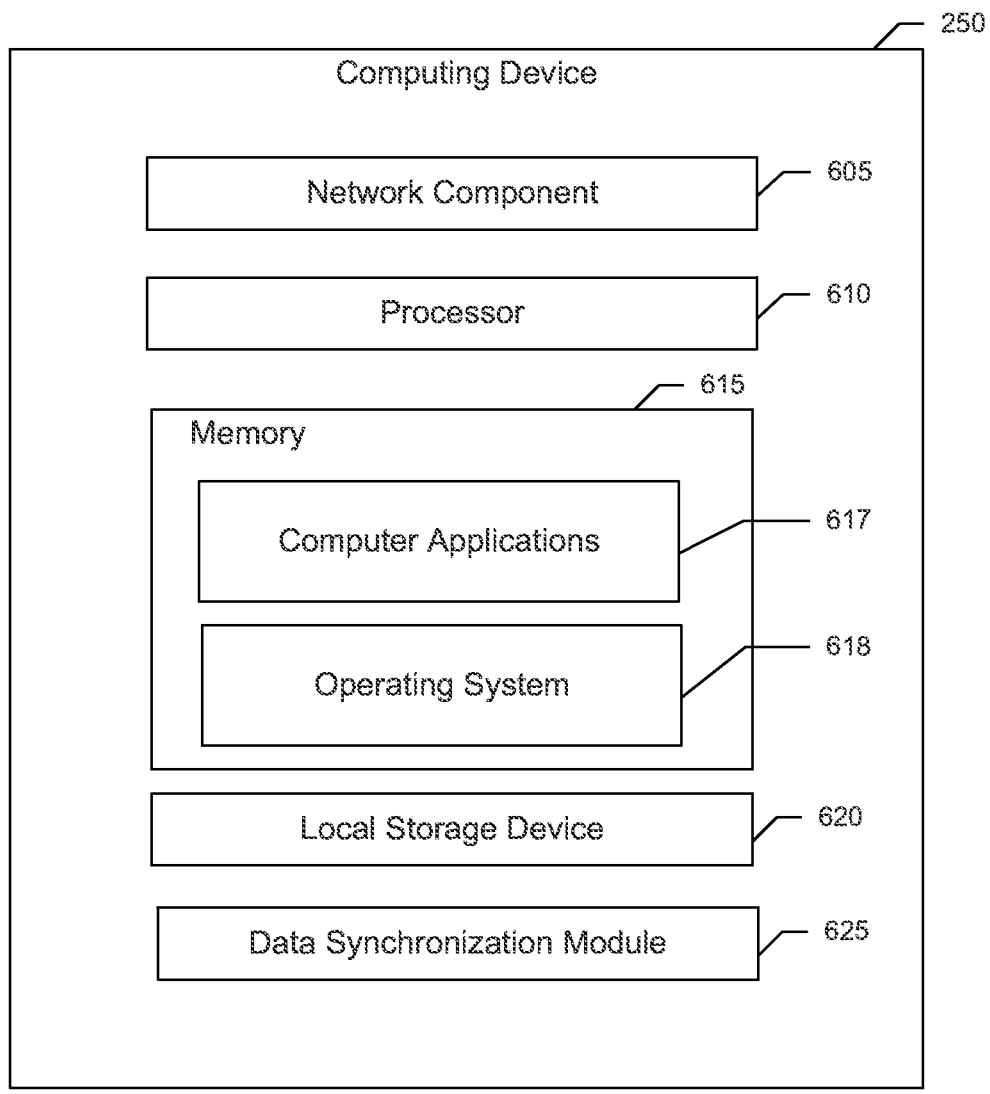
FIG. 6 is a block diagram of the computing device in the distributed backup system.

FIG. 6 illustrates a block diagram of a computing device 250. The computing device 250 can include a network component 605, a processor 610, a memory 615, the local storage device 620, and a data sync module 625. The memory 615 can store instructions of the operating system 618 of the computing device 250. The memory 615 can further store instructions of the computer applications 617 designed to run at the computing device 250.

The network component 605 can be capable of switching between states including a high power consumption state and a low power conservation state. The network component 605 can be, e.g. a Wi-Fi networking adapter, a cellular phone networking adapter, or a combination thereof. The network component 605 is configured for network communications with other devices, including the server 110 and the computing devices 130 and 140, e.g., for sending data files to the distributed backup system 100 for backup, receiving data files from the distributed backup system 100 upon synchronization. The processor 610 is configured to execute the computer applications 617 and the operating system 618 of the computing device 250. The memory 615 stores instructions of the operating system 618 which, when executed by the processor 610, cause the operating system 618 to perform processes for realizing certain functionalities of the computing device 250. For instance, the process of the operating system 618 can facilitate the data sync module 625 to synchronize the computing device 250 with the server 110 to backup data files to and/or download data files from the server 110 or other computing devices 130 and 140.

The local storage device 620, as described above, can store the instructions, the operating system 618, user data such as profile data of the user, data files of the user and any other data necessary for the operation of the computing device 250 and execution of the computer applications 617.

The data sync module 625 performs various data synchronization functions as described with reference to FIGS. 1-4. Additional details with respect to the data sync module 625 are described with reference to FIG. 7 below. Note that in some embodiments, the computing devices 130 and 140 also include components/modules described above with reference to computing device 250.

Figure 7:
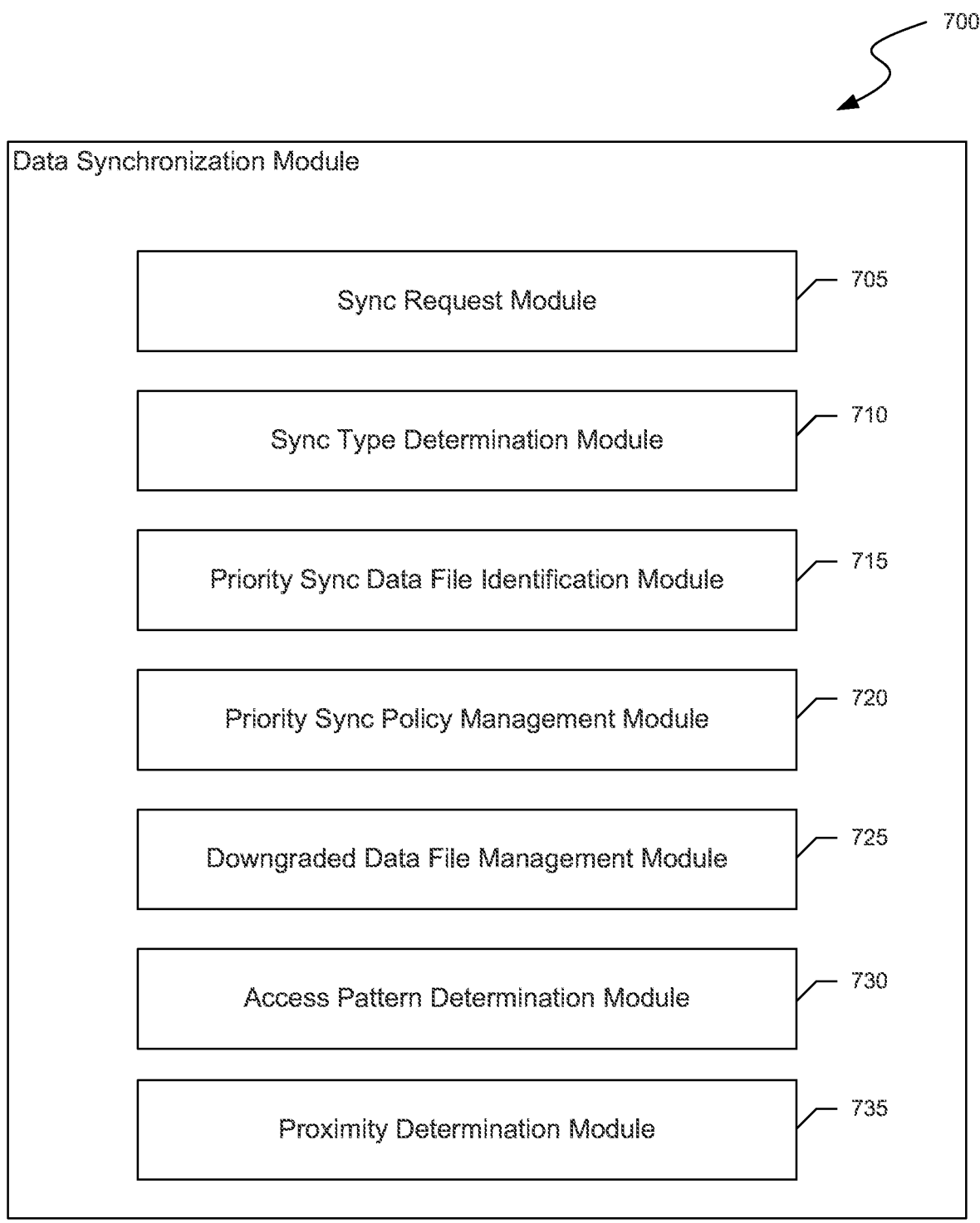
FIG. 7 illustrates a block diagram of a data synchronization module that can be implemented in the computing device and/or the server of the distributed backup system.

FIG. 7 illustrates a block diagram of a data synchronization module 700. In some embodiments, the data sync module 700 can be used to implement the data sync module 118 of the server 110 and/or one or more of the data sync modules 136, 146, and 620 of the computing devices 130, 140 and 250, respectively. In some embodiments, the data sync module 700 can be used for synchronizing one or more of the computing devices 130, 140 and 250 with a distributed backup system such as the distributed backup system 100.

Note that unless stated otherwise, the data sync module 700 in the following paragraphs is described with reference to the data sync module 118 of the server 110.

The data sync module 700 includes a sync request module 705 to generate and/or receive a sync request. For example, consider that a computing device 250 requests to synchronize with the server 110 for downloading data files of the user to the computing device. The sync request module 705 in the data sync module 625 of the computing device 250 generates a synchronization request and transmits the synchronization request to the server 110 via the network component 605. The server 110 receives the sync request from the computing device 250 at the sync request module 705 in the data sync module 118. The sync request can be for a normal sync or a priority sync. In some embodiments, the sync request includes information regarding the type of sync requested.

The data sync module 700 includes a synchronization type determination module 710 to determine the type of synchronization requested by the computing device 250. In some embodiments, sync requests from the computing devices can be categorized into normal sync or priority sync based on a synchronization type policy 215. For example, the sync type policy 215 may consider a sync request from any previously synchronized computing devices as a request for normal sync. In another example, the sync type policy 215 may consider a sync request from a previously synchronized computing device as a request for priority sync if the sync request specifies the request as a priority sync. In yet another example, the sync type policy 215 may consider a sync request from a new computing device of the user, e.g., a computing device that has not been previously synced with the server 110 as a priority sync. In still another example, the sync type policy 215 may consider a sync request from the third computing device 250 as a normal sync if the user has specified so in the request.

The data sync module 700 includes a priority-sync data file identification module 715 that is used to identify priority files of the user to be downloaded to the computing device 250 as part of a priority sync request. In some embodiments, a priority sync downloads a selected subset of the data files, e.g., priority files 210, rather than all of the data files, e.g., data files 205, of the user stored at the server 110 to minimize the consumption of computing resources. The priority files can be selected based on various criteria defined in the priority-sync policy 305. For example, the criteria can be based on an access pattern of the data files 205. In another example, the criteria can be based on attributes of a particular data file to be downloaded, e.g., a type, size, created date, modified date, a format, or a category. In still another example, the criteria can be based on attributes of the computing device 250, e.g., processing capacity, a total available space, size of a display, resolution of the display, battery capacity, or an operating system and/or applications executing on the computing device. In yet another example, the criteria can be based on (a) a likelihood of a particular data file being accessed by the user and/or (b) a likelihood of the particular data file being accessed using the third computing device 250.

The priority-sync data file identification module 715 identifies the priority files using the priority-sync policy 305 and transmits the priority files to the computing device 250 via the network component 505 of the server 110.

The data sync module 700 includes a priority-sync policy management module 720 that is used manage the priority-sync policy 305. The priority-sync policy management module 720 may provide a user interface to manage the priority sync policies, e.g., to customize existing priority sync policies or add new priority sync policies. The priority sync policies may be managed by the administrator of the distributed backup system 100 and/or the user of the computing devices 130, 140 and 250.

In some embodiments, the priority sync can also download the data files that are not identified as the priority files, that is, non-priority files, to the computing device 250. However, the priority sync can download the non-priority files in a downgraded format. The data sync module 700 includes a downgraded data file management module 725 to download the non-priority files in a downgraded format, e.g., downgraded compared to the original format of the data files 205. In some embodiments, the downgraded format of a particular data file can include one or more of (a) metadata of the particular data file, (b) a shortcut link to the particular data file, or (c) a reduced file size version of the original format of the particular data file stored at the server 110. For example, if a data file is an image file, the downgraded format of the image file can a reduced file size image file (e.g., a PNG format), a reduced image size such as a thumbnail, or a lower resolution version of the original format of the image file stored at the server 110. In another example, if the data file is an audio/video file, the downgraded format of the audio/video file can be a reduced file size audio/video file, a shorter duration audio/video file such as an audio or video file containing a particular duration, e.g. 30 seconds of the original audio/video file, or a lower bit-rate version of the original audio-video file stored at the server 110.

The downgraded data file management module 725 manages, e.g., generates, obtains or stores the downgraded format of the data files 205. In some embodiments, the downgraded data file management module 725 can generate and store downgraded format for at least some of the data files 205. Various known techniques can be used to generate a downgraded format of a particular data file. In some embodiments, the downgraded data file management module 725 can identify the source of a data file, and obtain a downgraded format of the data file from the source. For example, if an MP3 music file uploaded to the server 110 is a file that the user of the computing device 250 downloaded from a particular source, the downgraded data file management module 725 can obtain a downgraded format of the MP3 file, e.g., a lower bit rate or a shorter duration file, from the particular source and store at the storage device 116.

The data sync module 700 includes an access pattern determination module 730 to determine an access pattern of the data files for the user. The priority-sync policy management module 720 can use the access patterns to define the priority-sync policies 305 for identifying the priority files. The access pattern can include data (a) a frequency of access of a particular data file (b) a number of times the particular data file is requested or downloaded to any of the computing devices, from the particular computing device, (c) a frequency of access of the particular data file using a particular computing device similar to the computing device 250, (d) a period for which the particular data file is accessed using the particular computing device, (e) most recently accessed set of data files, (f) a period for which the particular data file is accessed, etc.

In some embodiments, the access pattern determination module 730 monitors the access of the data files 205 on the computing devices 130, 140 and 250 by the user, and generates an access pattern based on various parameters, e.g., last access time of a particular data file, a frequency of access. In some embodiments, the access pattern determination module 730 on each of the computing devices 130, 140 and 250 can monitor the access of the data files 205 on the respective computing devices and transmit the access pattern to the server 110. The server 110 can consolidate the access pattern received from the computing devices and generate a consolidated access pattern as a function of the access patterns on the individual devices. In some embodiments, the access pattern determination module 730 uses the access pattern to determine (a) the likelihood of a particular data file being accessed in the future and/or (b) the likelihood of the particular data file being accessed in the future using a particular computing device such as the computing device 250.

The data sync module 700 includes a proximity determination module 735 to determine if two computing devices are in proximity to each other. The proximity determination module 735 determines that two computing devices are in proximity to one another if the two computing devices satisfy a proximity based criterion. In some embodiments, the two computing devices satisfy a proximity based criterion if the computing devices share a common communication network, e.g. a wireless network such as a home Wi-Fi network. In some embodiments, the two computing devices satisfy a proximity based criterion if the computing devices can communicate directly, e.g., using direct communication techniques.

The proximity between two computing devices is determined for various reasons, including for facilitating the computing devices to communicate with each other directly instead of via the server 110. In some embodiments, a computing device can download a data file directly from another computing device that is in proximity to the computing device, instead of from the server 110, thereby minimizing any delay that can be caused in retrieving the data file from the server 110.

Figure 8:
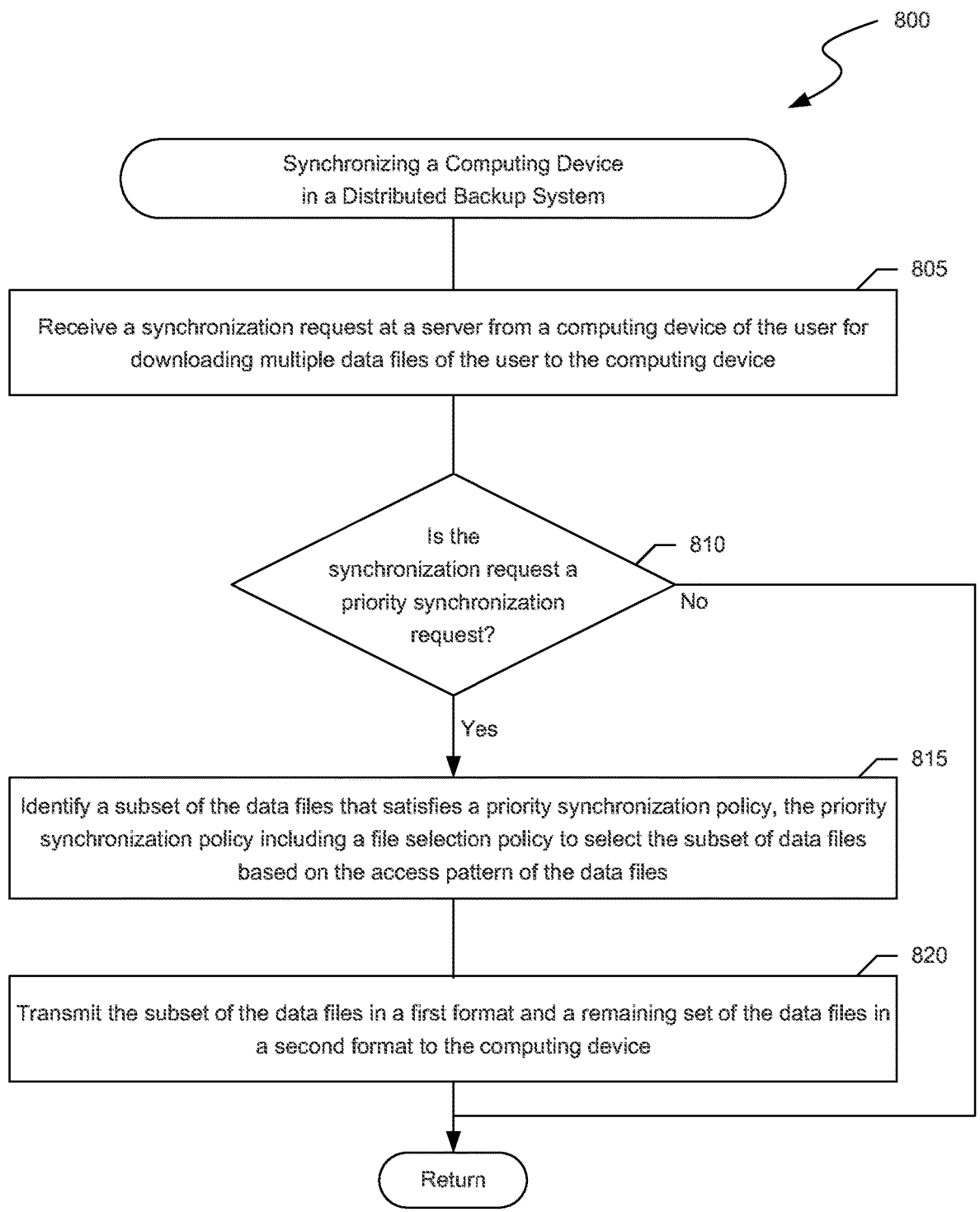
FIG. 8 is a flow diagram a process of performing a priority synchronization of the computing device in the distributed backup system.

FIG. 8 is a flow diagram a process 800 of performing a priority synchronization of a computing device in a distributed backup system. In some embodiments, the process 800 may be implemented in the distributed backup system 100 of FIG. 1, and using a data sync module 700 of FIG. 7. In some embodiments, data files, e.g., data files 205, of a user are stored in the server 110 and/or across multiple computing devices of the user in the distributed backup system 100. At block 805, the synchronization request module 705 of the server 110 receives a synchronization request from the computing device 250 for downloading the data files of the user to the computing device 250. In some embodiments the server 110 can be a cloud storage server. In some embodiments, the computing devices of the user are the devices using which the user typically accesses his data files. The computing devices can be mobile devices such as a smartphone, a tablet PC, a game console, a laptop etc.

At decision block 810, the sync type determination module 710 determines whether the synchronization request is for a priority sync of the computing device. Synchronization requests from the computing devices can be categorized into a normal sync or a priority sync. In some embodiments, a normal sync downloads all of the user data files from the server 110 that have been added to or changed in the server 110 since the computing device was last synchronized. In some embodiments, a priority sync can download a selected subset of the data files, that is, priority files, rather than all of the data files to minimize the consumption of computing resources. The priority files can be selected based on various factors, e.g., access pattern of the data files.

The sync type determination module 710 determines the type of sync using a synchronization type policy, e.g., synchronization type policy 215. For example, the sync type policy 215 may consider a sync request from any previously synchronized computing devices as a request for normal sync. In another example, the sync type policy 215 may consider a sync request from a previously synchronized computing device as a request for priority sync if the sync request specifies the request as a priority sync. In yet another example, the sync type policy 215 may consider a sync request from a new computing device of the user, e.g., a computing device that has not been previously synced with the server 110 as a priority sync. In still another example, the sync type policy 215 may consider a sync request from the third computing device 250 as a normal sync if the user has specified so in the request.

Referring back to decision block 810, responsive to a determination that the sync request is not for a priority sync, the process 800 returns. Alternatively, the process 800 may perform a normal sync of the computing device.

On the other hand, responsive to a determination that the sync request is for a priority sync, at block 815, the priority-sync data file identification module 715 identifies a subset of the data files that satisfies a priority synchronization policy as priority files, e.g., priority files 210. In some embodiments, the priority synchronization policy includes various criteria for identifying priority files. For example, the criteria can be based on an access pattern of the data files 205. In another example, the criteria can be based on attributes of a particular data file to be downloaded, e.g., a type, size, created date, modified date, a format, or a category. In still another example, the criteria can be based on attributes of the computing device 250, e.g., processing capacity, a total available space, size of a display, resolution of the display, battery capacity, or an operating system and/or applications executing on the computing device. In yet another example, the criteria can be based on (a) a likelihood of a particular data file being accessed by the user and/or (b) a likelihood of the particular data file being accessed using the third computing device 250.

At block 820, the network component 505 transmits the priority files 210 to the computing device 250 in their original format. For example, a high resolution JPG image file from the data files 205 identified as a priority file is transmitted in the same format. In some embodiments, the priority sync can also download non-priority files, that is, the data files that are not identified as the priority files, to the computing device 250. However, the non-priority files are downloaded to the computing device 250 in a downgraded format, e.g., downgraded compared to the original format of the data files 205.

The downgraded data file management module 725 downloads the non-priority files in the downgraded format. In some embodiments, the downgraded format of a particular data file can include one or more of (a) metadata of the particular data file, (b) a shortcut link to the particular data file, or (c) a reduced file size version of the original format of the particular data file stored at the server 110. For example, if a data file is an image file, the downgraded format of the image file can a reduced file size image file (e.g., a PNG format), a reduced image size such as a thumbnail, or a lower resolution version of the original format of the image file stored at the server 110. In another example, if the data file is an audio/video file, the downgraded format of the audio/video file can be a reduced file size audio/video file, a shorter duration audio/video file such as an audio or video file containing a particular duration, e.g. 30 seconds of the original audio/video file, or a lower bit-rate version of the original audio-video file stored at the server 110. After downloading the priority files, and optionally the non-priority files, the process 800 returns.

Figure 9:
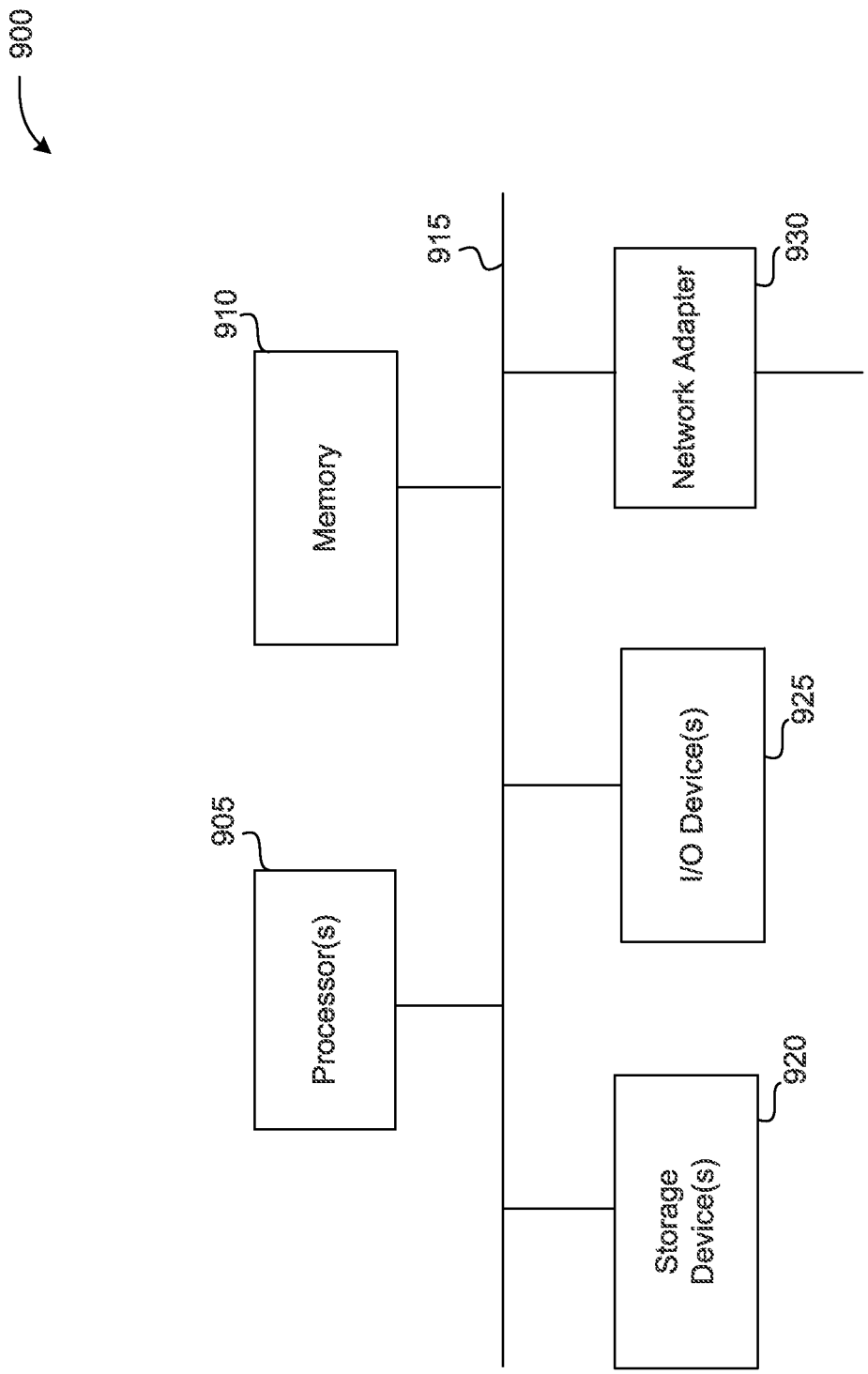
FIG. 9 is a block diagram of a computer system as may be used to implement features of some embodiments of the disclosed technology.

FIG. 9 is a block diagram of a computer system as may be used to implement features of some embodiments of the disclosed technology. The computing system 900 may be used to implement any of the entities, components or services depicted in the examples of FIGS. 1-8 (and any other components described in this specification). The computing system 900 may include one or more central processing units ("processors") 905, memory 910, input/output devices 925 (e.g., keyboard and pointing devices, display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 910 and storage devices 920 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 910 can be implemented as software and/or firmware to program the processor(s) 905 to carry out actions described above. In some embodiments, such software or firmware may be initially provided to the computing system 900 by downloading it from a remote system through the computing system 900 (e.g., via network adapter 930).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed:

1. A computer-implemented method for synchronizing a computing device of a user with a distributed backup system, the method comprising:

receiving, at a server in the distributed backup system, a request to synchronize the computing device with the server to download data files of the user to the computing device;

determining, by the server, whether there is previous synchronization between the server and the computing device with regard to the data files of the user;

responsive to determining that there is no previous synchronization between the server and the computing device with regard to the data files of the user, performing, by the server, a priority synchronization with the computing device, the priority synchronization identifying a first subset of the data files as priority files and a second subset of the data files as non-priority files, wherein the priority synchronization identifies the priority files based on at least one of a user selection of a set of data files or a user selection of one or more types of the data files to download, the priority files further identified based in part on an access pattern of the data files by the user on a set of other computing devices associated with the user, wherein the access pattern includes:
  (a) a frequency of access of a particular data file of the data files,
  (b) a frequency of access of the particular data file using a first computing device similar to the computing device,
  (c) a period for which the particular data file is accessed using the first computing device, or
  (d) a most recently accessed set of the data files;
responsive to determining that there is previous synchronization between the server and the computing device with regard to the data files of the user, performing, by the server, a normal synchronization with the computing device, the data files having the same priority in the normal synchronization;
transmitting, by the server, the priority files to the computing device; and
generating, by the server, a downgraded format version of a non-priority data file of the non-priority files, the downgraded format version of the non-priority data file being an audio file or video file having a lower bit rate and a smaller file size than an original format version of the audio file or video file stored at the server.

2. The computer-implemented method of claim 1, wherein the priority synchronization identifies the priority files based on
  (a) an attribute of a particular data file of the data files to be downloaded,
  (b) a likelihood of the particular data file being accessed by the user using the computing device, or
  (c) an attribute of the computing device.

3. The computer-implemented method of claim 1, wherein the priority synchronization identifies the priority files based on a type of the computing device.

4. The computer-implemented method of claim 1, wherein the priority files are transmitted in an original format of the priority files stored at the server.

5. The computer-implemented method of claim 1, further comprising:
  transmitting, by the server, the downgraded format version of the audio file or video file to the computing device.

6. The computer-implemented method of claim 5 further comprising:
  receiving, by the server, a second request from the user to download the original format version of the audio file or video file to the computing device; and
  transmitting, by the server, in response to the second request, the original format version of the audio file or video file to the computing device.

7. The computer-implemented method of claim 1, wherein transmitting the priority files to the computing device includes transmitting at least one of the priority files from one of the other computing devices that is within a threshold proximity to the computing device.

8. A server for transferring files to a computing device in a distributed backup system, the server comprising:
  a processor;
  a synchronization request module configured to work in cooperation with the processor to receive a synchronization request for downloading data files of a user to the computing device of the user;
  a synchronization type determination module configured to determine if the synchronization request is for a priority synchronization, the priority synchronization identifying a first subset of the data files as priority files and a second subset of the data files as non-priority files wherein the priority synchronization identifies the priority files based on at least one of a user selection of a set of data files or a user selection of one or more types of the data files to download;
  a priority-sync data file identification module configured to identify the priority files based on a priority-synchronization policy, wherein the priority-synchronization policy is based on an access pattern of the data files by the user, the access pattern including
    (a) a frequency of access of a particular data file of the data files,
    (b) a frequency of access of the particular data file using a first computing device similar to the computing device,
    (c) a period for which the particular data file is accessed using the first computing device, or
    (d) most recently accessed set of the data files;
  a downgraded data file management module configured to generate a downgraded copy of each non-priority file of the non-priority files, the downgraded copy of the non-priority files that are audio files or video files having a lower playback bit rate and a smaller file size than original copies of the non-priority audio files or video files stored at the server;
  a network component to transmit original copies of a first subset of the priority files to the computing device and the downgraded copies of the non-priority files to the computing device; and
  a proximity determination module configured to determine a second computing device that is within a threshold proximity to the computing device, wherein the server instructs the computing device to download original copies of a second subset of the priority files from the second computing device that is within the threshold proximity to the computing device.

9. The server of claim 8, wherein the data files of the user are at least one of:
  stored at the server or
  stored across a set of computing devices of the user.

10. The server of claim 8, wherein the downgraded copies of the non-priority files are stored at the server.

11. The server of claim 8, wherein the priority-synchronization policy is further based on
  (a) an attribute of a particular data file of the data files to be downloaded,
  (b) a likelihood of the particular data file being accessed by the user using the computing device, or
  (c) an attribute of the computing device.

12. The server of claim 8, wherein the downgraded copies of the non-priority files are generated by the server in advance of the synchronization request.

13. A computing device for downloading files from a distributed backup system, the computing device comprising:
  a processor;

a synchronization request module configured to work in cooperation with the processor to generate a priority synchronization request for downloading data files of a user associated with the computing device from the distributed backup system to the computing device, the priority synchronization request causing the computing device to download a first subset of the data files identified as priority files and a second subset of the data files as non-priority files by identifying the first subset of the data files as priority files and the second subset of the data files as non-priority files based on at least one of a user selection of a set of data files or a user selection of one or more types of the data files to download, wherein each non-priority audio file or video file of the non-priority files is downloaded in a downgraded format having a lower bit rate and a smaller file size than an original format of the non-priority audio file or video file stored by the distributed backup system, wherein the priority files in the distributed backup system are identified based on a priority-synchronization policy, wherein the priority-synchronization policy is based on an access pattern of the data files by the user on the set of computing devices, the access pattern including:

(a) a frequency of access of a particular data file of the data files, (b) a frequency of access of the particular data file using a first computing device similar to the computing device, (c) a period for which the particular data file is accessed using the first computing device, or (d) most recently accessed set of the data files; and a network component configured to download original copies of a first subset of the priority files from a server in the distributed backup system, the downgraded copies of the non-priority files from the distributed backup system, and original copies of a second subset of the priority files from a second computing device that is within a threshold proximity to the computing device.

14. The computing device of claim 13, wherein the data files of the user are at least one of:

stored at the server, or stored across a set of computing devices of the user in the distributed backup system.

15. The computing device of claim 13, wherein the priority-synchronization policy is further based on (a) an attribute of a particular data file of the data files to be downloaded, (b) a likelihood of the particular data file being accessed by the user using the computing device, or (c) an attribute of the computing device.

16. The computing device of claim 13, wherein the downgraded copies of the non-priority files are generated by the server in advance of the priority synchronization request.

* * * * *